(12) United States Patent
Arioka et al.

(10) Patent No.: US 6,459,567 B2
(45) Date of Patent: Oct. 1, 2002

(54) GAS-INSULATED SWITCHGEAR

(75) Inventors: Masahiro Arioka; Hiroshi Isoya; Takakazu Harada, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/867,704

(22) Filed: May 31, 2001

(30) Foreign Application Priority Data

Jun. 2, 2000 (JP) ........................................ 2000-166143

(51) Int. Cl.[7] ................................................ H02B 1/56
(52) U.S. Cl. .......................... 361/604; 174/18; 361/608; 361/618
(58) Field of Search .............................. 174/18; 218/43, 218/68, 155–157; 361/601, 604–605, 608, 611, 616, 618

(56) References Cited

U.S. PATENT DOCUMENTS

| | | | |
|---|---|---|---|
| 4,370,512 A | * 1/1983 | Thomas | 174/18 |
| 4,445,162 A | * 4/1984 | Hamm et al. | 361/601 |
| 5,715,134 A | 2/1998 | Maineult et al. | |

FOREIGN PATENT DOCUMENTS

| | | |
|---|---|---|
| EP | 0 678 956 | 10/1995 |
| JP | 5-23711 | 3/1993 |
| JP | 9-308032 | 11/1997 |

* cited by examiner

*Primary Examiner*—Gregory Thompson
(74) *Attorney, Agent, or Firm*—Sughrue Mion, PLLC

(57) ABSTRACT

A gas-insulated switchgear comprising bushings mounted to and passing through a vessel wall of the hermetic vessel, each having an outer end connected to an insulated bus conductor at the outside of the hermetic vessel and an inner end connected to the electric device within the hermetic vessel. Each of the bushings has a central axis that is perpendicular to the common axis of the electric device and spaced apart from each other in the direction of extension of the common axis and shifted by a predetermined angle with respect to each other about the common axis. The flat bushing mounting vessel walls are tilted from inside to outside relative to other portion of the wall.

4 Claims, 4 Drawing Sheets

US 6,459,567 B2

GAS-INSULATED SWITCHGEAR

CROSS REFERENCE TO RELATED APPLICATION

This application is based on Application No. 2000-166143, filed in Japan on Jun. 2, 2000, the contents of which are hereby incorporated by reference.

BACKGROUND OF THE INVENTION

This invention relates to a gas-insulated switchgear and, more particularly, to a bushing for a gas-insulated switchgear for the connection to the insulated bus conductors of the electric power system for example.

FIG. 5 illustrates a conventional gas-insulated switchgear disclosed in Japanese Patent Laid-Open No. 6-12948. In this gas-insulated switchgear, disposed within a hermetic vessel 2 filled with an electrically insulating gas are interrupters 5 and a vessel wall of the hermetic vessel 2 has mounted thereon bushings 8 for electrically connecting the interrupters 5 to insulated bus conductors 13. The bushings 8 are disposed in parallel to each other and extend through the vessel wall of the hermetic vessel 2 and are connected to the interrupters 5 by means of elongated conductors 17 within the hermetic vessel 2.

FIG. 6 illustrates another conventional gas-insulated switchgear disclosed in Japanese Utility Model Laid-Open No. 5-23711. In this gas-insulated switchgear, a hermetic vessel 2 in which an electrically insulating gas is filled has contained therein disconnectors 4 and interrupters 5 and three insulated bus conductors 13 are electrically connected to the interrupters 5 through bushings 8 mounted to the vessel wall of the hermetic vessel 2. The bushings 8 have different configurations from each other and extend through the vessel wall of the hermetic vessel 2 to be connected to contacts 9 of the disconnectors 4 disposed in alignment on a common axis within the hermetic vessel 2.

According to the above-described conventional gas-insulated switchgear, for the gas-insulated switchgear shown in FIG. 5, a large space is needed for accommodating the elongated electric conductors 17 extending from the tip of the bushing 8, resulting in a large hermetic vessel 2. Also, for the gas-insulated switchgear shown in FIG. 6, different bushings of different configurations must be used to position the tips of the bushings 8 in alignment with the common axis, thus posing disadvantages that the gas-insulated switchgear is large-sized, installation area is large and that the product price is high.

Accordingly, the main object of the present invention is to provide a gas-insulated switchgear free from the above-discussed problems.

Another object of the present invention is to provide a gas-insulated switchgear that is small-sized, the bushings for each phase are the same and that the mechanical strength of the hermetic vessel can be improved.

SUMMARY OF THE INVENTION

With the above objects in view, the present invention resides in a gas-insulated switchgear comprising electric devices disposed in parallel to have a common axis for each phase for opening and closing electric circuits, a hermetic vessel containing the electric devices and filled with an electrically insulating gas and bushings mounted to and passing through a vessel wall of the hermetic vessel and each having an outer end connected to an insulated bus conductor at the outside of the hermetic vessel and an inner end connected to the electric device with the hermetic vessel. Each of the bushings has a central axis that is perpendicular to the common axis of the electric device and spaced apart from each other in the direction of extension of the common axis and shifted by a predetermined angle with respect to each other about the common axis.

The vessel walls of the hermetic vessel to which the bushings are mounted may be flat and may have a portion that extends at an angle from an inside position to an outside position with respect to other portion of the vessel wall so that the central axis of the bushings define predetermined angles therebetween that correspond to the predetermined angle of the central axis of the bushings.

The inner ends of the bushings mounted to the hermetic vessel may be positioned on said common axis.

The inner ends of the bushings may have mounted thereon contacts of the disconnectors.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
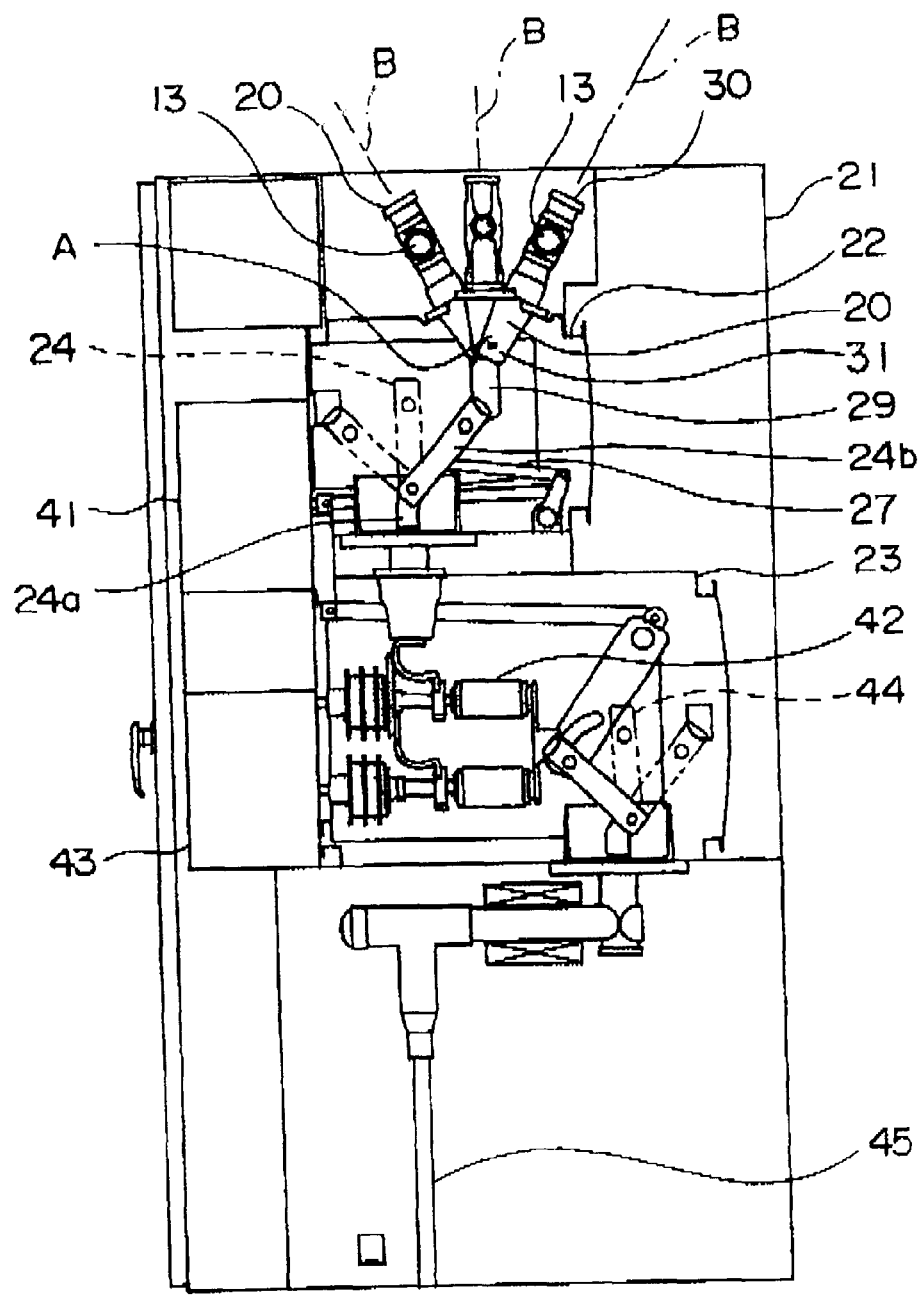
FIG. 1 is a schematic side view of one embodiment of a gas-insulated switchgear of the present invention.
Figure 2:
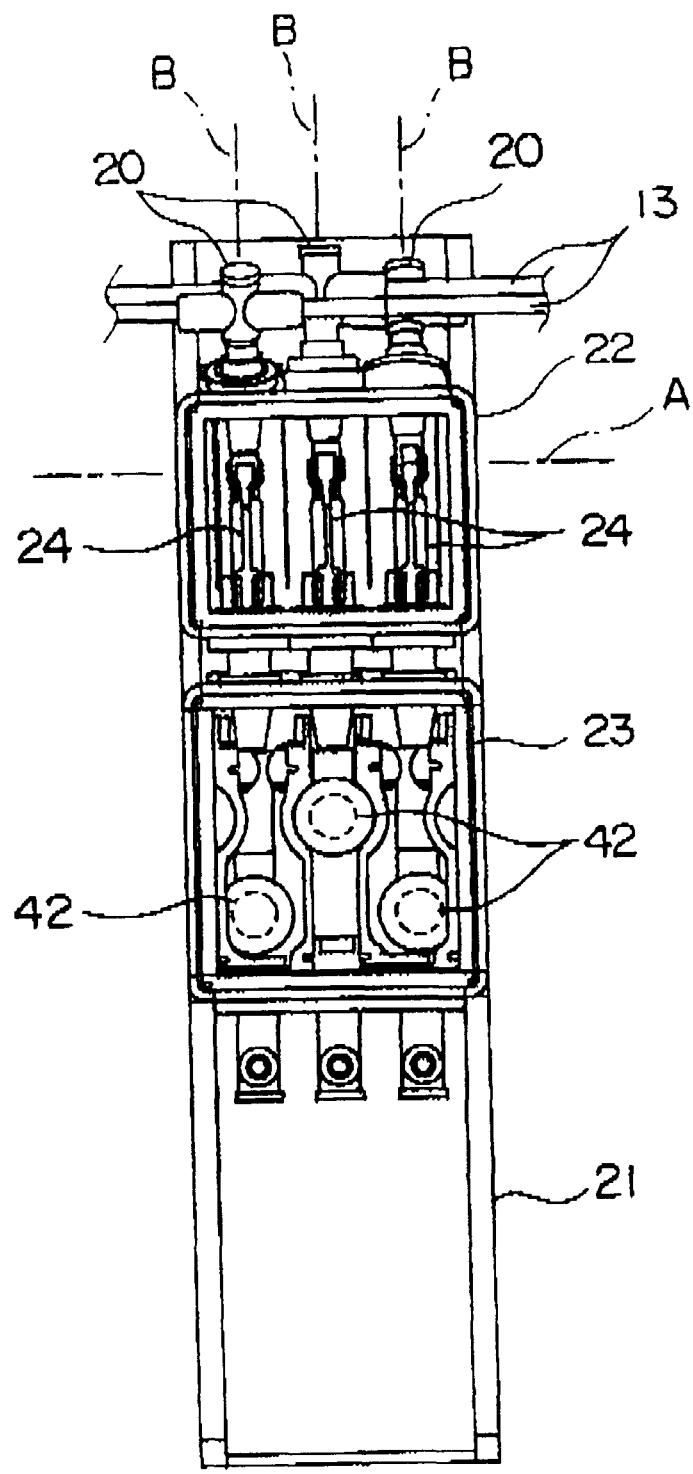
FIG. 2 is a schematic side view of the gas-insulated switchgear shown in FIG. 1.
Figure 3:
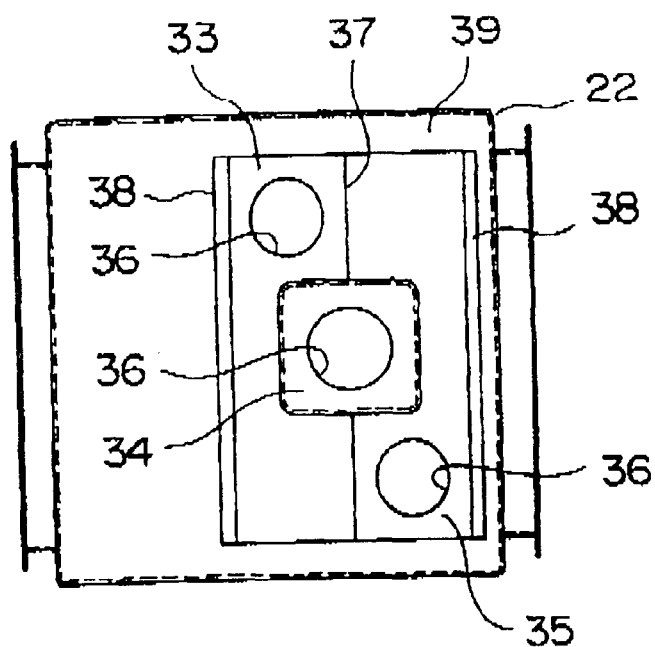
FIG. 3 is a top plan view of the hermetic vessel shown in FIG. 1.
Figure 4:
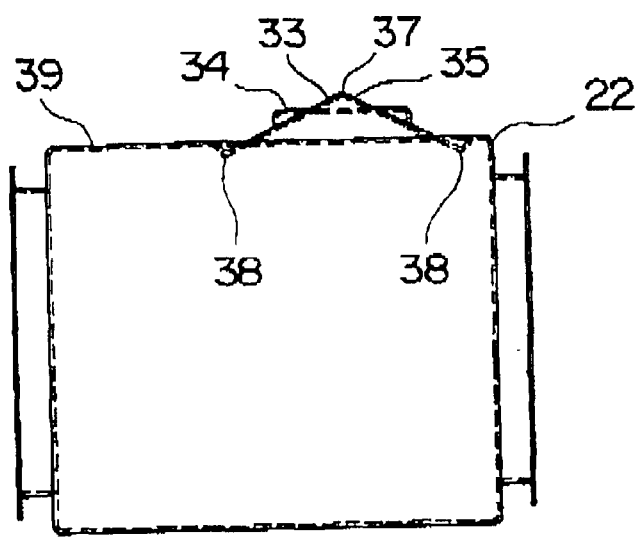
FIG. 4 is a side view of the hermetic vessel shown in FIG. 1.
Figure 5:
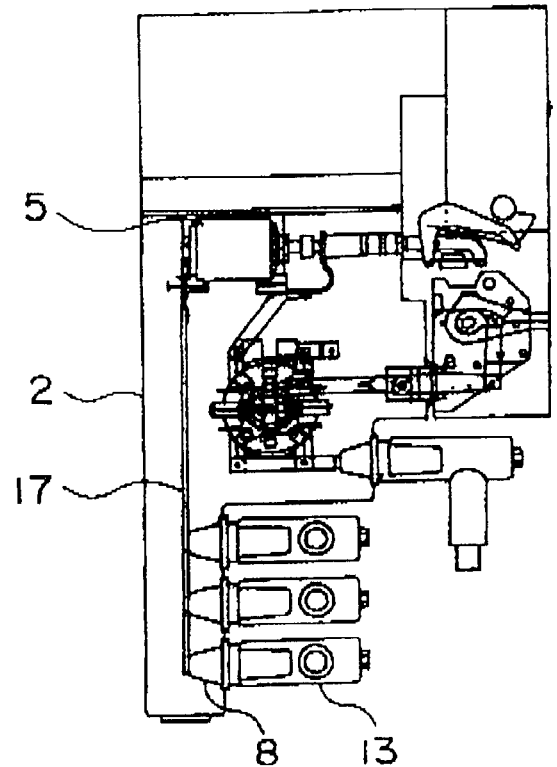
FIG. 5 is a schematic side view of a conventional gas-insulated switchgear in which the bushings are arranged in parallel.
Figure 6:
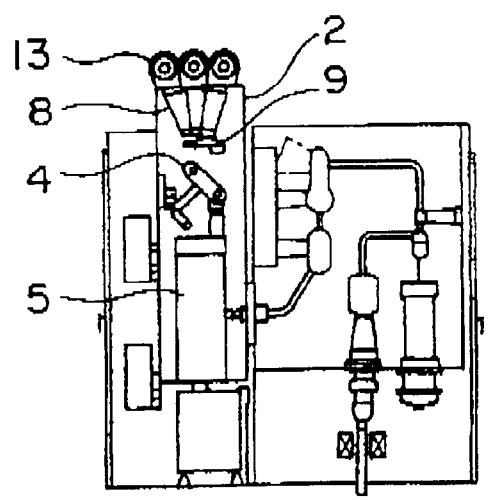
FIG. 6 is a schematic side view of another gas-insulated switchgear in which the bushings of different configuration are employed.

FIGS. 1 and 2 illustrate a gas-insulated switchgear including a housing of the present invention. The reference numeral 21 depicts a power distribution box of a gas-filled switchgear for three-phase ac circuit. Within the distribution box 21, two hermetic vessels 22 and 23 are mounted one on another, the upper hermetic vessel 22 having mounted therein interrupters (which will be referred to as a first disconnectors) 24 corresponding to the respective phases, a blade 24b pivoted at a connection terminal 24a at one end and a lever 27 made of an electrically insulating material for operating the blade 24b. The hermetic vessel 22 has a substantially a triangular or a prism configuration as shown in FIGS. 3 and 4 at the section to which the bushings are mounted so that the bushings 20 of the same configuration have tips located on the same axis A that passes through the contacts 29 of the disconnectors 24 when the bushings 20 are mounted to the triangular wall section of the hermetic vessel 22. The tips of the insulated bushings 20 mounted to the hermetic vessel 22 to extend through the vessel wall are provided with disconnector contacts 29. Accordingly, the bushings 20 can be used in common, eliminating the need for a separate electrical conductor from the tips of the bushings 20 to the disconnector contacts 29, allowing the hermetic vessel 22 to be made small.

As shown from FIGS. 3 and 4, the triangular configuration of the section of the hermetic vessel 22 to which the bushings 20 are attached has a bottom portion of the triangle that is lower than the top wall of the hermetic vessel 22 to allow the hermetic vessel 22 to be small-sized. Also, by bending the bottom portion of the triangle as just discussed, the stress that generates in the hermetic vessel 22 can be decreased.

In other words, the gas-insulated switchgear of the present invention, as shown in FIGS. 1 and 2, the hermetic vessel 22 filled with electrically insulating gas contains electric devices which are disconnectors 24 for each phase for opening and closing electric circuits are disposed in parallel to have a common axis A. The vessel wall of the hermetic vessel 22 has mounted thereon the bushings 20 mounted to and passing through a vessel wall of the hermetic vessel 22. The bushings 20 each has an outer end 30 connected to the insulated bus conductor 13 at the outside of the hermetic vessel 22 and an inner end 31 connected to the electric device or the disconnectors 24 within the hermetic vessel 22.

According to the present invention, each of the bushings 20 has a central axis B that is perpendicular to the common axis A of the electric device and spaced apart from each other in the direction of extension of the common axis A and shifted by a predetermined angle with respect to each other about the common axis A.

In order to mount the bushings 20 in such the arrangement to the hermetic vessel 22, the vessel walls 22, 23, 24 of the hermetic vessel 22 to which the bushings 20 are mounted are flat and have some of portion 33, 35 that inclines and extends from an inside position to an outside position with respect to other portion of the vessel wall, as apparent from FIGS. 3 and 4, so that the central axis B of the bushings 20 define predetermined angles therebetween that correspond to the predetermined angle of the central axis B of the bushings 20.

As seen from FIG. 4, the mounting vessel walls 33 and 35 which are portions of the mounting vessel walls 33, 34 and 35 have substantially rectangular shape in plan and the connection portion 37 at which two neighboring portions are connected and raised to provide slopes at both sides of the connection portion to define a ridge, thereby to generally defining a triangular or gabled root shape. The lower portions 38 at the opposite sides of the gabled roof are made lower than the top wall 39 of the vessel wall to be inside of the outer contour of the hermetic vessel 22, so that the gabled roof portion projecting from the contour of the hermetic vessel 22 becomes undesirably large. Thus, the mounting walls 33 and 35 inclined as above discussed extend from the inner position relative to other portion of the hermetic vessel wall to the outer position, so that the central axis B of the bushings 20 when the bushings 20 are mounted to the mounting walls are arranged to have a predetermined angles between them.

The central mounting wall portion 34 of the three mounting wall portions 33, 34 and 35 is the substantially square flat portion disposed in parallel to and below the vessel wall surface 39 of the hermetic vessel 22. The central mounting wall portion 34 is also provided with a circular opening 36 for mounting the busing 20 therein.

Thus, each of the mounting wall portions 33, 34 and 35 are different in the orientation of the inclination, so that, when the bushings 20 are mounted to the mounting wall portion, the directions of axis B of the bushings 20 have respectively different orientations and, as apparent from FIG. 2, the central axis B of the bushings 20 are spaced apart from each other in the direction of the common axis A of the disconnectors 24, and are perpendicular to the common axis A and further as apparent from FIG. 1, they are shifted by a predetermined angle about the common axis A. Also, the inner ends 31 of the bushings 20 are aligned on the common axis A and the contacts 29 of the disconnectors 29 are provided on the inner ends 31 and on the common axis A.

The gas-insulated switchgear also comprises a disconnector operating mechanism 41 for operating the disconnector 24, a switches 42 disposed within the second hermetic vessel 23, an operating mechanism 43 for the switches 42, a three-position switches 44 and a cables 45 extending from the three-position switches 44.

Thus, according to the present invention, the arrangement being such that the vessel wall of the hermetic vessel at which the bushings for each phase are mounted in configured so that the bushings are directed in different directions and the tips of the bushings are positioned on the common axis when the bushings of the same configuration are used and that the contacts are provided at the tips on the common axis, whereby the switchgear can be small-sized the same bushings can be used in common to all phases. Also, since the vessel wall of the hermetic vessel at which the bushings for each phase are mounted is configured so that the bushings are directed in different directions and the end portions of the mounting vessel wall are bent inwardly to become lower than the top wall of the hermetic vessel, whereby the mechanical strength of the hermetic vessel is improved and the switchgear can be further small-sized.

As has been described, the gas-insulated switchgear of the present invention comprises electric devices disposed in parallel to have a common axis for each phase for opening and closing electric circuits, a hermetic vessel containing the electric devices and filled with an electrically insulating gas and bushings mounted to and passing through a vessel wall of the hermetic vessel and each having an outer end connected to an insulated bus conductor at the outside of the hermetic vessel and an inner end connected to the electric device within the hermetic vessel. Each of the bushings has a central axis that is perpendicular to the common axis of the electric device and spaced apart from each other in the direction of extension of the common axis and shifted by a predetermined angle with respect to each other about the common axis. Therefore, the large space for accommodating the elongated electric conductors extending from the tip of the bushing can be eliminated to make the hermetic vessel small and the bushings of the same configurations cant be used to position the inner tips of the bushings in alignment with the common axis, thus enabling the gas-insulated switchgear to be large-sized, installation area to be large and the manufacturing cost to be low.

The vessel walls of the hermetic vessel to which the bushings are mounted may be flat and may have a portion that extends at an angle from an inside position to an outside position with respect to other portion of the vessel wall so that the central axis of the bushings define predetermined angles therebetween that correspond to the predetermined angle of the central axis of the bushings, so that the bushings of the same configurations cant be used, enabling the gas-insulating switchgear to be made less expensive.

The inner ends of the bushings mounted to the hermetic vessel may be positioned on said common axis, so that the bushings of the same configurations cant be used, enabling the gas-insulated switchgear to be large-sized, installation area to be large and the manufacturing cost to be low.

The inner ends of the bushings may have mounted thereon contacts of the disconnectors, so that the bushings of the same configurations cant be used to position the inner tips of the bushings in alignment with the common axis, thus enabling the gas-insulated switchgear to be large-sized, installation area to be large and the manufacturing cost to be low.

What is claimed is:

1. A gas-insulated switchgear comprising:

electric devices disposed in parallel to have a common axis for each phase for opening and closing electric circuits;

a hermetic vessel containing said electric devices and filled with an electrically insulating gas;

bushings mounted to and passing through a vessel wall of said hermetic vessel, said bushings each having an outer end connected to an insulated bus conductor at the outside of said hermetic vessel and an inner end connected to one of said electric devices within said hermetic vessel, wherein each of said bushings has a central axis that is perpendicular to said common axis of said devices and spaced apart from each other in the direction of extension of said common axis and shifted by a predetermined angle with respect to each other about said common axis.

2. The gas-insulated switchgear as claimed in claim 1 wherein said vessel wall of said hermetic vessel to which said bushings are mounted is flat and has a portion that angularly extends from an inside position to an outside position with respect to other portions of said vessel wall so that said central axis of said bushings define predetermined angles therebetween that correspond to said predetermined angle of said central axis of said bushings.

3. The gas-insulated switchgear as claimed in claim 1 wherein said inner end of each of said bushings mounted to said hermetic vessel is positioned on said common axis.

4. The gas-insulated switchgear as claimed in claim 1 wherein said inner end of each of said bushings has mounted thereon a disconnector contact.

* * * * *